Jan. 9, 1940. R. M. RANEY ET AL 2,186,149
TERMINAL POST SEAL FOR BATTERIES
Filed Sept. 4, 1937

INVENTOR.
ROBERT M. RANEY
FRANK ALTMAYER
BY
ATTORNEYS

Patented Jan. 9, 1940

2,186,149

UNITED STATES PATENT OFFICE 2,186,149

TERMINAL POST SEAL FOR BATTERIES

Robert M. Raney, Euclid, and Frank Altmayer, Cleveland, Ohio, assignors to Willard Storage Battery Company, Cleveland, Ohio, a corporation of West Virginia Application September 4, 1937, Serial No. 162,496

3 Claims. (Cl. 136—181)

This invention relates to a terminal post seal for batteries, especially storage batteries.

It is desirable, when a battery manufacturer ships batteries to dealers and others who sell directly to users, that the terminals of the batteries be provided with seals which may bear the trademark or insignia of the manufacturer and which prevent the application of the usual terminal clamps unless the seals are broken and removed from the terminals. Thus, when a battery is sold with the manufacturer's seal applied to the terminal posts, the purchaser has reasonable assurance that be is obtaining a new battery and not a used or reconditioned battery.

An object of the present invention is to provide a terminal post seal which is inexpensive and can be readily applied and which effectively prevents the application of a terminal clamp unless the seal is first broken and removed.

The invention may be further briefly summarized as consisting in certain novel details of construction and combinations and arrangements of parts which will be described in the specification and set out in the appended claims.

In the accompanying sheet of drawings.

Figure 1:
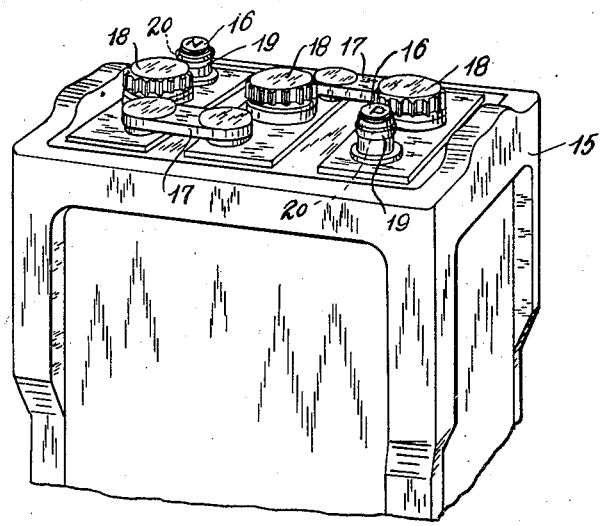
Fig. 1 is a perspective view of an upper part of a storage battery having terminal posts which are provided with our improved seal.
Figure 3:
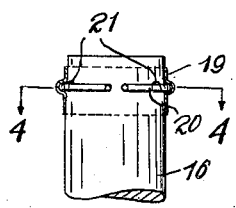
Fig. 3 is an elevation of a portion of the post with the seal applied and with the sleeve which forms a part of the seal in section.
Figure 4:
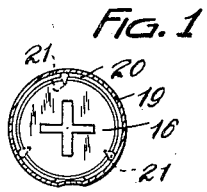
Fig. 4 is a top view of the post with the sleeve in section, substantially along the line 4—4 of Fig. 3.
Figure 5:
Fig. 5 is a perspective view of one form of split or divided ring which is applied to the terminal post so as to tightly grip the same before the sleeve is applied.
Figure 2:
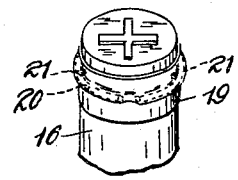
Fig. 2 is a perspective view on an enlarged scale of a portion of a terminal post with the seal applied thereto.
Figure 6:
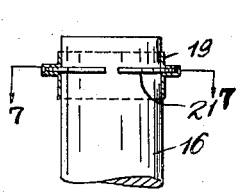
Figure 7:
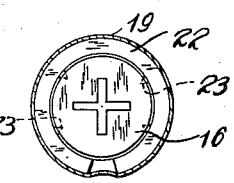
Figure 8:
Figure 9:
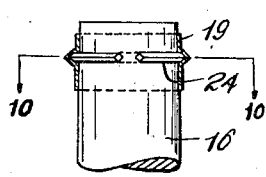
Figure 10:
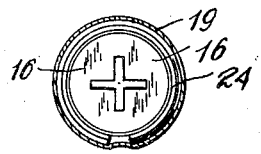
Figure 11:
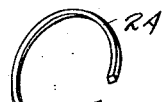

Figs. 6, 7, and 8 are views similar to Figs. 3, 4, and 5, respectively, showing a modification in the form of the split ring; and Figs. 9, 10, and 11 are views similar to Figs. 3, 4, and 5, respectively, showing another modification in the form of the split ring.

Referring now to the drawing, 15 represents a storage battery which may be of usual or standard form and which may have any number of cells and the details of which are immaterial to the present invention. In this instance a three-cell battery is shown, the same being provided with the usual slightly tapered upstanding terminal posts 16, cross-connectors 17, and vent plugs 18.

When the battery is to be used, conductors are connected to the terminal posts 16 usually by split clamps which are slid onto and then tightened on the posts. It is to the posts 16 that our improved seals are applied for the purpose previously explained.

Briefly stated, the seal embodying the present invention comprises a sleeve which is shrunk onto the post and suitable means applied to the post to prevent removal of the sleeve without destroying it. The latter consists preferably of a split ring which is applied to the post before the sleeve is applied and which grips and virtually bites into the post which is relatively soft since it is formed of lead, so that when the sleeve is subsequently applied to the post over the ring and shrinks tightly thereon and around the same, a double or two-fold action is obtained in the respect that the sleeve prevents the ring from being opened up and slipped off the post while on the other hand the ring effectively prevents the sleeve from being slipped off the post since the sleeve is shrunk tightly onto the post over the ring and above and below the same.

In the drawing, the sleeve is designated 19. While the sleeve may be made of various materials, we prefer to use a cellulose sleeve which when wet is more or less gelatinous and on drying shrinks very materially. Such a sleeve is insulating and is substantially non-elastic. However, a sleeve formed of any other materials which answer the requirements may be employed. This sleeve may cover any desired part of the exposed portion of the post but preferably it does not cover the upper end of the post. At least a portion of the end of the post is preferably left uncovered so that the dealer or other person having custody of the battery before it is sold to the user can readily charge the battery in the customary manner.

The ring which is fitted onto the post before the sleeve is applied may be of various forms. In Figs. 3, 4, and 5, the ring designated 20 is in the form of a split round wire spring ring with a few teeth 21 projecting inwardly so that when the ring is expanded it can be readily slipped onto the post, and, when released, it contracts and the teeth 21 will bite into the post and hold the ring to the latter.

In Figs. 6, 7, and 8, the ring is shown in the form of a stamped split sheet metal washer 22 with teeth 23 at its inner periphery. This washer can be spread and slipped onto the post and then released so that the teeth 23 will bite into the post the same as the spring wire 20.

In Figs. 9, 10, and 11, we have shown a split spring ring 24 made from wire which is substantially square in cross-section, this ring being formed in a manner such that one edge of the square wire is on the inner periphery so that when this ring is spread and slipped onto the post to the proper position and released, the inner more or less sharp edge will bite into the lead and thus grip the post so that removal is prevented after the sleeve 19 is applied. With a ring of this kind, the special teeth, such as the teeth 21 of Figs. 3, 4, and 5, and the teeth 23 of Figs. 6, 7, and 8, are done away with.

These rings may be made of any suitable material which answers the requirements, but they are preferably made of metal, such as iron or steel, which has the desired springiness or elasticity.

Thus, in applying the seal, the split ring is first expanded and slipped down onto the post and then released so that it will spring inwardly and bite into the post. Then the sleeve, while in wet condition and thus expanded, is slipped over the post and over the ring. As the sleeve dries it contracts and tightly grips the ring and the post in the manner indicated in the drawing. The sleeve shrinks to such an extent that it cannot be slipped off the post, and it grips the ring and post so tightly that the ring cannot be expanded and slipped off the post. Consequently, the seal cannot be removed without cutting or breaking the sleeve and thus destroying it, and, therefore, so long as the seal is on the post the usual conductor terminal or clamp cannot be applied to the post for normal use of the battery.

It will be seen, therefore, that the advantages of our invention in the way of cheapness, ease of application, and effectiveness for the purpose intended are attained to a very high degree. We do not desire to be confined to the precise details or materials mentioned but aim in our claims to cover all modifications which do not constitute a departure from the spirit and scope of the invention.

Having thus described our invention, we claim:

1. A battery having a terminal post with an upper portion adapted to be engaged by a terminal clamp, and a seal surrounding said portion of the post, said seal comprising a sleeve of non-elastic material shrunk onto said portion of the post and a sleeve retainer applied to the post and located between the latter and the sleeve, said retainer engaging the post in biting relation therewith and held from movement lengthwise thereof while it is covered by the sleeve and in turn preventing the sleeve from being moved lengthwise of the post, said retainer being removable from the post after the sleeve has been destroyed and removed, after which the terminal clamp may be applied.

2. A battery having a terminal post with an upper portion adapted to be engaged by a terminal clamp, and a seal surrounding said upper portion of the post, said seal comprising a sleeve shrunk onto said portion of the post and a sleeve retainer applied to the post and located between the latter and the sleeve, said sleeve being formed of substantially non-elastic insulating material and said retainer being in biting relation with the post and removable therefrom after the sleeve is removed, thereby permitting the application of the clamp.

3. A battery having a terminal post with an upper portion adapted to be engaged by a terminal clamp, and a seal surrounding said upper portion of the post and adapted to be engaged by the clamp, said seal comprising a sleeve shrunk onto said portion of the post and a sleeve retainer applied to the post and located between the latter and the sleeve, said sleeve being formed of substantially non-elastic insulating material and said retainer being in the form of a split ring and being in biting relation with the post and removable therefrom after the sleeve is removed.

ROBERT M. RANEY.
FRANK ALTMAYER.